(12) United States Patent
Hamedovic et al.

(10) Patent No.: US 9,086,023 B2
(45) Date of Patent: Jul. 21, 2015

(54) METHOD AND DEVICE FOR RECOGNIZING UNCONTROLLED COMBUSTIONS IN AN INTERNAL COMBUSTION ENGINE

(75) Inventors: Haris Hamedovic, Moeglingen (DE); Wolfgang Fischer, Gerlingen (DE); Carsten Kluth, Stuttgart (DE); Werner Haeming, Neudenau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 271 days.

(21) Appl. No.: 13/502,589

(22) PCT Filed: Oct. 13, 2010

(86) PCT No.: PCT/EP2010/065342
§ 371 (c)(1),
(2), (4) Date: Jul. 9, 2012

(87) PCT Pub. No.: WO2011/061014
PCT Pub. Date: May 26, 2011

(65) Prior Publication Data
US 2012/0271536 A1    Oct. 25, 2012

(30) Foreign Application Priority Data

Nov. 23, 2009    (DE) .......................... 10 2009 046 961

(51) Int. Cl.
*G06F 19/00*    (2011.01)
*G06F 17/00*    (2006.01)
(Continued)

(52) U.S. Cl.
CPC .............. *F02D 35/02* (2013.01); *F02D 35/027* (2013.01); *F02D 35/028* (2013.01);
(Continued)

(58) Field of Classification Search
CPC ..... F02D 35/02; F02D 35/028; F02D 35/027; F02D 41/008; F02D 41/009; G01M 15/11; G01L 23/225
USPC ............. 123/406.11, 406.22, 406.24, 406.37, 123/406.4, 406.41, 406.43, 406.58, 406.26, 123/406.27; 73/114.04, 114.02; 701/111
See application file for complete search history.

(56) References Cited

U.S. PATENT DOCUMENTS 4,936,277 A * 6/1990 Deutsch et al. ............... 123/436
5,056,487 A * 10/1991 Yamakado et al. ........... 123/436
(Continued)

FOREIGN PATENT DOCUMENTS

DE    102008001830    12/2008
DE    102007024415    1/2009
(Continued)

OTHER PUBLICATIONS

International Search Report, PCT International Application No. PCT/EP2010/065342, dated Mar. 11, 2011.

*Primary Examiner* — Lindsay Low
*Assistant Examiner* — George Jin
(74) *Attorney, Agent, or Firm* — Kenyon & Kenyon LLP

(57) ABSTRACT

A method for recognizing uncontrolled combustions in an internal combustion engine which occur independently of the ignition by a spark plug. The pressure oscillations in the combustion chamber triggered by the combustion are detected and evaluated. To allow identification at any time of an uncontrolled combustion prior to ignition by the spark plug and/or prior to the normal combustion initiation for a given ignition point, the rotational speed of a crankshaft of the internal combustion engine which is influenced by the pressure oscillations, is evaluated.

16 Claims, 3 Drawing Sheets

(51) Int. Cl.
  *F02D 35/02* (2006.01)
  *F02D 41/00* (2006.01)
  *G01L 23/22* (2006.01)
  *G01M 15/11* (2006.01)
  *F02D 41/14* (2006.01)

(52) U.S. Cl.
  CPC ......... *F02D 41/008* (2013.01); *F02D 41/1497* (2013.01); *G01L 23/225* (2013.01); *G01M 15/11* (2013.01); *F02D 41/009* (2013.01)

(56) References Cited

U.S. PATENT DOCUMENTS

| | | | |
|---|---|---|---|
| 5,127,262 A * | 7/1992 | Demizu et al. | 73/114.06 |
| 5,632,247 A * | 5/1997 | Hashizume et al. | 123/406.26 |
| 5,670,713 A * | 9/1997 | Machida et al. | 73/114.03 |
| 5,775,299 A * | 7/1998 | Ito et al. | 123/436 |
| 5,870,688 A * | 2/1999 | Kanbara et al. | 701/110 |
| 6,006,155 A * | 12/1999 | Wu et al. | 701/111 |
| 6,425,371 B2 * | 7/2002 | Majima | 123/406.24 |
| 6,714,852 B1 * | 3/2004 | Lorenz et al. | 701/102 |
| 6,827,063 B2 * | 12/2004 | Breitegger et al. | 123/406.58 |
| 6,883,497 B2 * | 4/2005 | Wozniak et al. | 123/406.26 |
| 6,907,341 B2 * | 6/2005 | Aono et al. | 701/111 |
| 7,302,932 B2 * | 12/2007 | Shelby et al. | 123/406.26 |
| 7,458,249 B2 * | 12/2008 | Kassner | 73/35.06 |
| 7,599,783 B2 * | 10/2009 | Nakane | 701/104 |
| 8,122,868 B2 * | 2/2012 | Zavala Jurado et al. | 123/406.11 |
| 8,265,859 B2 * | 9/2012 | Rollinger et al. | 701/111 |
| 8,392,094 B2 * | 3/2013 | Makino et al. | 701/102 |
| 8,439,011 B2 * | 5/2013 | Glugla et al. | 123/305 |
| 8,538,626 B2 * | 9/2013 | Kumar et al. | 701/33.7 |
| 2005/0183697 A1 * | 8/2005 | Yoshino et al. | 123/406.37 |
| 2005/0197762 A1 * | 9/2005 | Yoshino et al. | 701/111 |
| 2007/0137617 A1 * | 6/2007 | Schueler et al. | 123/406.24 |
| 2008/0148826 A1 * | 6/2008 | Raichle et al. | 73/114.27 |
| 2010/0031923 A1 * | 2/2010 | Weng | 123/406.24 |
| 2010/0206125 A1 * | 8/2010 | Heppel | 74/572.2 |
| 2011/0265560 A1 * | 11/2011 | Lee et al. | 73/114.04 |
| 2012/0271536 A1 * | 10/2012 | Hamedovic et al. | 701/111 |
| 2012/0330536 A1 * | 12/2012 | Rollinger et al. | 701/104 |
| 2013/0268180 A1 * | 10/2013 | Gottschalk et al. | 701/111 |
| 2014/0007664 A1 * | 1/2014 | Ito et al. | 73/114.02 |

FOREIGN PATENT DOCUMENTS

| | | |
|---|---|---|
| DE | 102009008247 | 8/2010 |
| EP | 1715179 | 10/2006 |
| JP | 2-136566 | 5/1990 |
| JP | 8-261129 | 10/1996 |
| JP | 9-273436 | 10/1997 |
| JP | 2003-175485 | 6/2003 |
| JP | 4109062 | 6/2008 |
| JP | 2009-108760 | 5/2009 |

* cited by examiner

METHOD AND DEVICE FOR RECOGNIZING UNCONTROLLED COMBUSTIONS IN AN INTERNAL COMBUSTION ENGINE

FIELD OF THE INVENTION

The present invention relates to a method for recognizing uncontrolled combustions in an internal combustion engine which in particular occur independently of the ignition by a spark plug, the pressure oscillations in the combustion chamber triggered by the combustions being detected and evaluated, and a device for carrying out the method.

BACKGROUND INFORMATION

In a gasoline engine, the vehicle is set in driving operation and/or the driving operation is maintained as the result of combustion of the supplied fuel-air mixture. The combustion of the fuel-air mixture is initiated by the ignition spark of a spark plug. As the flame front propagates in the combustion chamber, the high pressures and temperatures result in auto-ignitions in the end-gas zone. The combustion, which then proceeds suddenly, causes a great pressure rise in the combustion chamber of the gasoline engine which generates a pressure wave that propagates and strikes the walls adjoining the combustion chamber, where the high-frequency oscillations are converted into structure-borne noise. These oscillations are detected by knock sensors (structure-borne noise sensors) and taken into account in controlling the gasoline engine by knock control in order to prevent engine damage. The gasoline engine is always operated at the knock limit in an efficiency-optimized manner, thus avoiding damage to the gasoline engine as a result of the knocking.

However, in addition to the described knocking combustions, auto-ignitions occur as the result of hot spots in the combustion chamber, oil droplets, or hot residual gas zones in the fuel-air mixture. Such auto-ignitions may appear as pre-ignitions before the ignition spark occurs, and as post-ignitions after the ignition spark occurs. The auto-ignitions are characterized by combustion pressures having high pressure amplitudes, which may very quickly result in engine damage.

European Patent No. EP 1 715 179 A2 describes determining premature combustions with the aid of the knock sensor. However, since such auto-ignitions involve a knocking combustion only to a limited degree due to high-frequency pressure components, it is not possible to detect auto-ignitions, which have predominantly low-frequency pressure patterns which do not affect the structure-borne noise of the combustion chamber walls, using knock sensors.

SUMMARY

An example method according to the present invention for recognizing uncontrolled combustions in an internal combustion engine, may have the advantage that auto-ignitions, which are not triggered by an ignition spark of a spark plug and which involve low-frequency pressure patterns optionally having high-frequency pressure components, may be reliably detected at any time. In order to identify an uncontrolled combustion prior to the ignition by the spark plug and/or prior to the normal combustion initiation, the rotational speed of a crankshaft of the internal combustion engine which is influenced by the pressure oscillations is evaluated for a given ignition point, a knock sensor is not necessary for the evaluation. The recognition of the uncontrolled combustions is based solely on the evaluation of the rotational speed characteristic of the crankshaft. Since the rotational speed of the crankshaft is measured for controlling and/or regulating the engine, additional outlay of hardware for measuring the rotational speed is dispensed with.

It is advantageous that the rotational speed of the crankshaft is determined, and, as a function of the measured rotational speed, a parameter which characterizes the combustion is ascertained and compared to a corresponding parameter which has been determined during a controlled combustion due to the ignition of a spark plug, and the presence of an uncontrolled combustion is deduced if the parameter deviates from the reference parameter. Such a procedure is usable in a particularly advantageous manner for engine designs that are characterized by a high power density, in particular as the result of downsizing concepts. Since auto-ignitions cause a shift in the pressure pattern in the combustion chamber due to a change in the combustion pressure component, this may be easily detected by evaluating the rotational speed signal of the crankshaft.

In one example embodiment, the parameter which is a function of the rotational speed is a gas torque which acts on the crankshaft due to the pressure oscillations in the combustion chamber as the result of the combustion. Since the force acting on the connecting rod of a piston of the gasoline engine due to the pressure pattern changes the speed of the crankshaft, in the state of compression of a cylinder of the gasoline engine this results in a decrease in the speed of the crankshaft, while the speed of the crankshaft is increased during combustion. Such speed changes, to which the gas torque contributes, may be well represented based on the altered rotational speed due to the speed change.

In one refinement, the parameter which is a function of the rotational speed is a changed combustion position.

The determined gas torque and/or the determined combustion position is/are advantageously compared to reference values which have been ascertained during the controlled combustion due to the ignition by the spark plug, it being possible to take instantaneous manipulated variables and the operating point of the internal combustion engine into account in the comparison. By selecting the reference values in each case in conjunction with the instantaneous state of the internal combustion engine, the comparison to the parameters deduced from the rotational speed is particularly reliable, since the operating conditions of the internal combustion engine which are instantaneously present at the point in time that the parameters are determined are also taken into account.

In one variant, the ignition angle, the load, and the rotational speed are taken into account as instantaneous manipulated variables in the comparison of the combustion position brought about by the combustion to the combustion position which results from the controlled combustion due to ignition by the spark plug.

In one embodiment, the combustion position resulting from the combustion is determined with the aid of at least one characteristic map which includes the instantaneous manipulated variables, and/or a physically based mathematical model which contains the instantaneous manipulated variables. Before starting a measurement, characteristic maps may be easily ascertained for all conceivable operating states of the internal combustion engine, thus ensuring rapid ascertainment of the instantaneously resulting combustion position in the comparison.

In one refinement, the gas torques, which occur on the crankshaft due to the pressure oscillations in the combustion chamber as a result of the combustion, are ascertained as alternating torques. These alternating torques may be easily ascertained based on the variations in the rotational speed over time, since they are caused by the deceleration or acceleration of the crankshaft.

The alternating torques are advantageously corrected with regard to the oscillating masses and/or the variations in the alternating torques over time and/or the sensor wheel errors. The oscillating masses are formed primarily by the pistons of the cylinders of the internal combustion engine, which for this application adversely affect the variation in the alternating torques over time, for which reason their components are arithmetically eliminated from the alternating torques. A more accurate result in determining uncontrolled combustion is thus obtained.

In one variant, the variation in the alternating torques over time for each cylinder in a suitable range is added to one final integral value in each case in a suitable crankshaft window, on the basis of which a cylinder-individual gas torque for each cylinder of the internal combustion engine is deduced in each case. Based on such a cylinder-individual gas torque, it may be determined in which particular cylinder of the internal combustion engine an uncontrolled combustion occurs, since this integration is carried out separately for each cylinder.

Alternatively, the variation in an alternating torque over time is divided into at least two ranges, a final integral value being computed for each range, and each final integral value being compared to a reference final integral value, or the final integral values being compared to one another, and an uncontrolled combustion being deduced when a deviation occurs. The two ranges are advantageously situated in such a way that the integral value determined from the first range is sensitive to combustion which is triggered by the ignition spark of the spark plug, while the second range characterizes an integral value which represents an abnormally early combustion position. The ranges are a function at least of the operating point of the engine and of the ignition angle.

In one example embodiment, for making a decision concerning the presence of an uncontrolled combustion, reference values are used which are ascertained based on the values of prior combustion positions. The engine-specific predictions, which are represented by the reference values, concerning the actual combustion positions during a controlled combustion which are triggered by an ignition spark of the spark plug are thus verified. In the comparison to the rotational speed-dependent combustion position to be investigated, these reference values contribute to an increase in accuracy in the ascertainment of an uncontrolled triggered combustion.

In one example refinement, the rotational speed is evaluated on the basis of tooth times of the sensor wheel which is mounted on the crankshaft. Thus, standard methods for determining the rotational speed may be used in the example method for ascertaining an uncontrolled combustion in a gasoline engine. Alternatively, segments containing multiple tooth times may be used.

Another example refinement of the present invention relates to an example device for recognizing uncontrolled combustions in an internal combustion engine which occur independently of the ignition by a spark plug, the pressure oscillations in the combustion chamber triggered by the combustion being evaluated. To be able to reliably detect at any time auto-ignitions which are not triggered by an ignition spark of a spark plug, means are present which evaluate the rotational speed of a crankshaft of the internal combustion engine which is influenced by the pressure oscillations in order to identify an uncontrolled combustion prior to the ignition by the spark plug. Thus, a knock sensor for evaluating the method according to the present invention is not necessary, since the recognition is based on the evaluation of the rotational speed of the crankshaft, which as such is already measured for other purposes of engine control and injection. Combustions having low-frequency pressure patterns and also possibly containing high-frequency pressure components are detected with the aid of the means that are used.

The present invention allows numerous specific embodiments. One of these is explained in greater detail with reference to the figures.

BRIEF DESCRIPTION OF THE DRAWINGS

Identical features are denoted by the same reference numerals.

DETAILED DESCRIPTION OF EXAMPLE EMBODIMENTS

Figure 1:
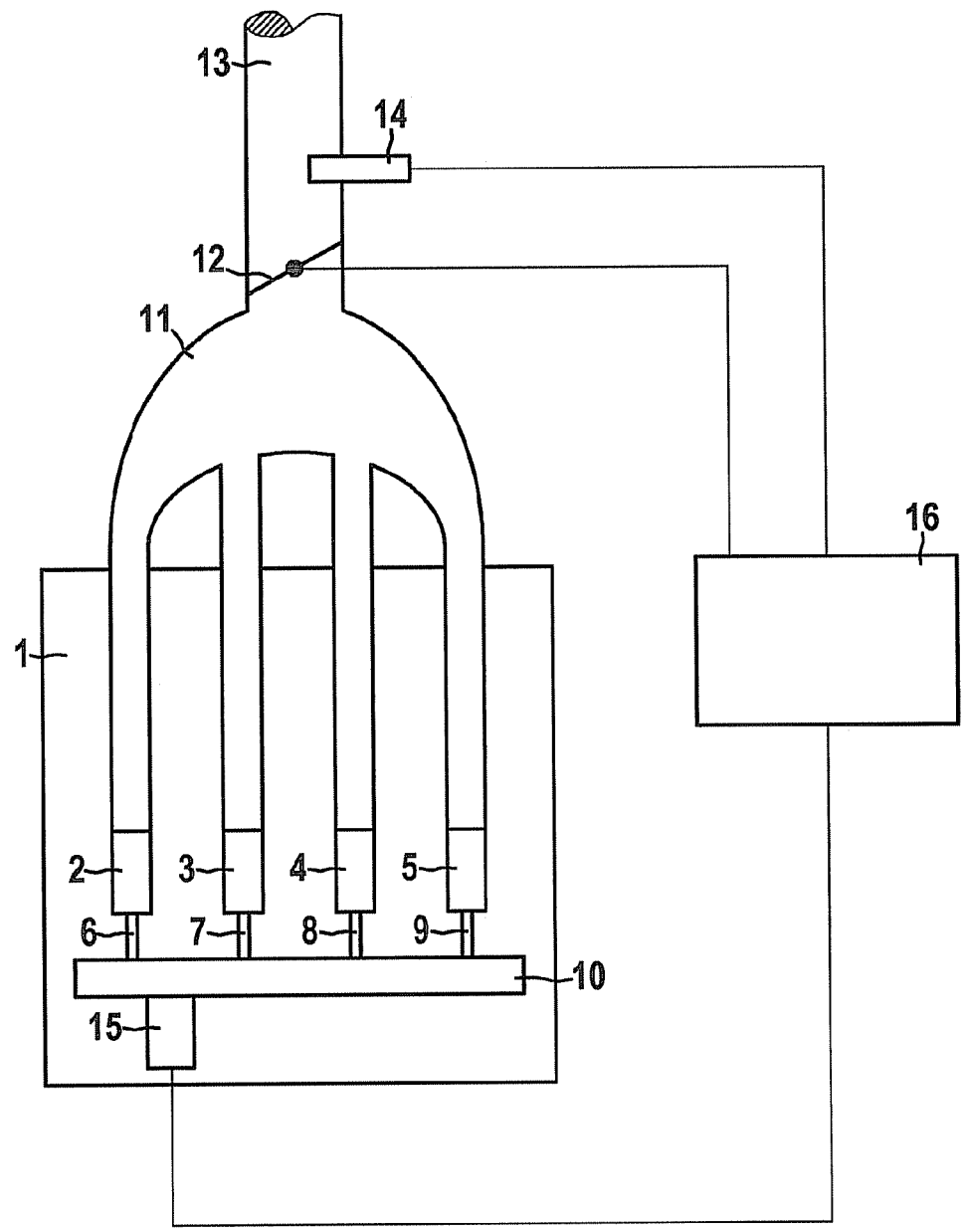
FIG. 1 shows a device for determining an uncontrolled combustion in a gasoline engine.

FIG. 1 shows an example device for measuring a combustion in a gasoline engine 1. In this example, gasoline engine 1 has four cylinders 2, 3, 4, 5 whose pistons, not illustrated in greater detail, which move in cylinders 2, 3, 4, 5, are each connected to crankshaft 10 via a connecting rod 6, 7, 8, 9, respectively, and drive the crankshaft due to pressure changes caused by the combustions. Cylinders 2, 3, 4, 5 are connected to an intake manifold 11, which is closed off with respect to an air intake pipe 13 by a throttle valve 12. A nozzle 14 for injecting fuel, thus forming a fuel-air mixture, protrudes into air intake pipe 13. Alternatively, gasoline engine 1, in particular a downsizing engine, may be equipped with a direct injection system which injects the fuel separately for each cylinder with the aid of an injector. In addition, a significant feature is supercharging, which is generally carried out by a turbocharger, not illustrated in greater detail, but which may also be a two-stage process.

A rotational speed sensor 15 is situated on crankshaft 10 which detects the rotational speed of crankshaft 10 and relays same to a control unit 16 which classifies the combustions based on the ascertained rotational speed. In addition, control unit 16 is connected to throttle valve 12 and to fuel injection nozzle 14.

When throttle valve 12 is open, the fuel-air mixture flows into intake manifold 11 and thus into cylinders 2, 3, 4, 5. A spark triggered by a spark plug, not illustrated in greater detail, triggers a combustion in cylinders 2, 3, 4, 5 in succession, causing a pressure rise in the cylinder which is transmitted via the piston and connecting rod 6, 7, 8, 9 to crankshaft 10, setting the crankshaft in motion.

Figure 2:
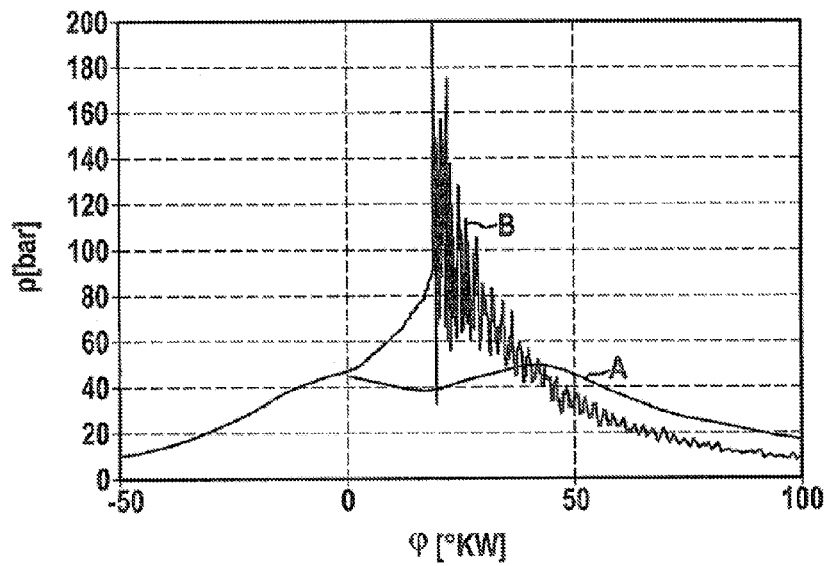
FIG. 2 shows a comparison of an uncontrolled combustion to a normal combustion.

The pressure over the changing crankshaft angle which results during such a normal controlled combustion is illustrated in FIG. 2, curve A.

In addition to the controlled combustions, combustions occur which have a very early combustion initiation, or have combustion positions which are present prior to the ignition point of the spark plug. These combustions are referred to as "superknocking." Such superknocking is illustrated in curve B of FIG. 2, from which it is apparent that, compared to normal combustions, superknocking generates significantly higher pressures, which are damaging to gasoline engine 1.

Figure 3:
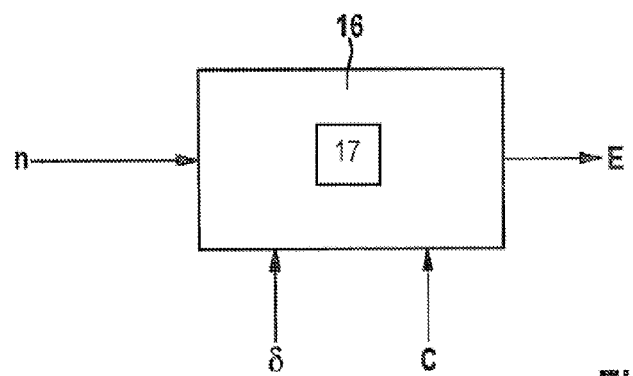
FIG. 3 shows a schematic illustration of a method for ascertaining an uncontrolled combustion.

Control unit 16 has an algorithm 17 for classifying the combustions into normal combustions and superknocking, as illustrated in FIG. 3. The algorithm uses rotational speed n of crankshaft 10 as an input variable. The force which drives crankshaft 10 changes, depending on the particular pressure that acts on the piston and connecting rod 6, 7, 8, 9 of cylinder 2, 3, 4, 5, respectively. Crankshaft 10 is thus accelerated, or the motion of crankshaft 10 is slowed. If cylinder 2 3, 4, 5 is in a compression phase, i.e., the piston moves toward the top dead center, the speed of crankshaft 10 is slowed. If cylinder 2, 3, 4, 5 is in the combustion phase, the piston moves away from the top dead center due to the explosive combustion that occurs, thus increasing the speed of crankshaft 10. Oscillations caused by oscillating masses are superimposed on rotational speed n. To adjust the evaluation of the rotational speed of crankshaft 10 in a targeted manner to the instantaneous operating situation of the gasoline engine, ignition angle δ and operating point C of gasoline engine 1 are taken into account as operating parameters to allow a determination of whether or not superknocking is present.

Figure 4:
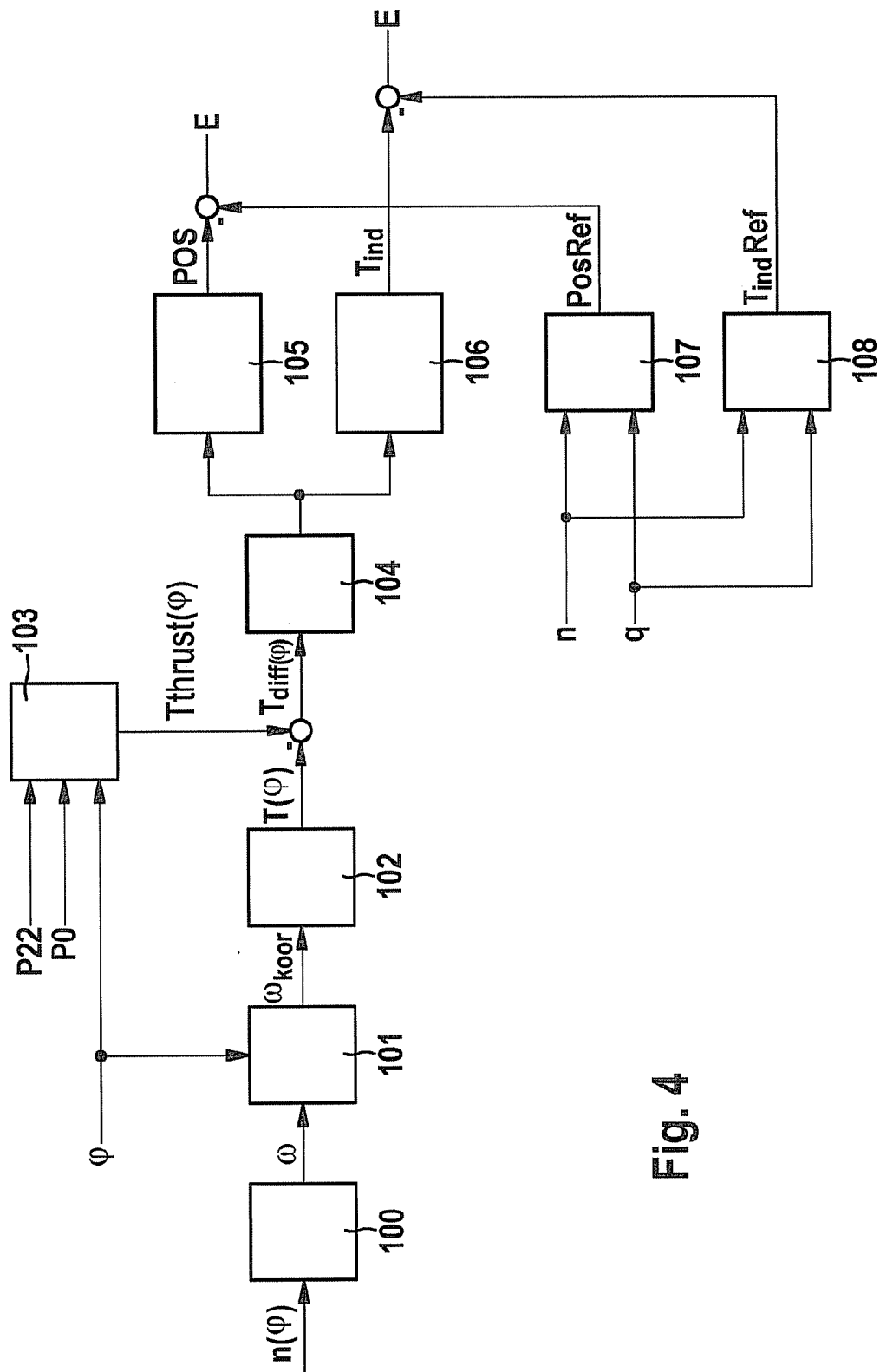
FIG. 4 shows one exemplary embodiment of an algorithm for ascertaining an uncontrolled combustion.

One exemplary embodiment of an algorithm for determining an uncontrolled combustion is explained with reference to FIG. 4. Rotational speed n of crankshaft 10, which is ascertained as a function of crank angle φ by rotational speed sensor 15, is initially converted into an angular velocity in block 100. The effects of the oscillating masses, which are caused primarily by the pistons of cylinders 2, 3, 4, 5, are compensated for in block 101. In addition, errors in the angular velocity which are caused by so-called tooth errors are corrected in this block 101. Tooth errors result, for example, from imprecise installation and manufacture of the sensor wheel, and may be ascertained by conventional methods. This results in a corrected angular velocity $\omega_{koor}$, which in block 102 is initially differentiated according to crankshaft angle φ and then multiplied by the overall rotational moment of inertia of crankshaft 10. This results in a variation in gas torque over time T(φ) of the operation of gasoline engine 1 during combustion.

At the same time, a thrust gas torque Tthrust(φ) is determined in block 103 based on a measurement of charge pressure p22 and of ambient pressure p0, as well as instantaneous crankshaft angle φ, the changes in the environmental parameters such as the engine temperature and/or cooling water temperature also being taken into account by corrections.

Thrust gas torque Tthrust(φ) is subtracted from variation in gas torque over time T(φ), resulting in variation in gas torque of combustion over time Tdiff (φ). The effects of the dragged operation and of the charge pressure are taken into account. The cylinder-individual features are obtained after filtering in block 104. Combustion position POS is computed as the first feature in block 105, while an average induced gas torque Tind is determined in block 106. The filtered difference in variation in gas torque over time Tdiff (φ) is integrated over the angular range of φ1 to φ2 of crankshaft angle φ.

Combustion position POS is subsequently compared to a reference value PosRef, which is ascertained in block 107 from a characteristic map in which the combustion position of the normal combustions, i.e., combustions which have been triggered by the ignition spark of a spark plug, is stored as a function of rotational speed n and overall fuel quantity q.

In addition, ascertained average induced gas torque Tind is compared to a reference value TindRef, which likewise is stored in a characteristic curve as a function of rotational speed n of crankshaft 10 and of fuel quantity q (block 108). If differences, either for combustion position POS or average induced gas torque Tind or for both, occur with respect to the particular determined reference value PosRef or TindRef, control unit 16 recognizes superknocking, i.e., a combustion having a combustion position that is too early, in result E of the comparison.

What is claimed is:

1. A method for recognizing an uncontrolled combustion in an internal combustion engine which occurs independently of an ignition by a spark plug, the uncontrolled combustion occurring at least one of prior to ignition by the spark plug and prior to a normal combustion initiation for a given ignition point, the method comprising:
    determining a rotational speed of a crankshaft of the internal combustion engine, which is influenced by pressure oscillations in a combustion chamber triggered by the combustion;
    as a function of the determined rotational speed, ascertaining a parameter which characterizes the combustion, wherein the parameter is of gas torques in which a variation over time is divided into at least two ranges;
    computing a final integral value for each range;
    comparing at least one of:
        each of the final integral values to a reference final integral value, which has been determined during a controlled combustion due to the ignition of the spark plug;
        both of the final integral values to each other; and
        a difference between the final integral values to a reference comparative value; and
    deducing a presence of the uncontrolled combustion in response to a determination of a deviation in the comparing step.

2. The method as recited in claim 1, wherein at least one of an instantaneous manipulated variable and an operating point of the internal combustion engine is taken into account in the comparison.

3. The method as recited in claim 2, wherein a combustion position is used as a further parameter for comparison to a corresponding reference parameter.

4. The method as recited in claim 3, wherein the reference value to which the determined combustion position is compared is ascertained during the controlled combustion due to the ignition by the spark plug.

5. The method as recited in claim 4, wherein an ignition angle, a load, and a rotational speed are taken into account as instantaneous manipulated variables in the comparison of the combustion position brought about by the combustion to the combustion position which results from the controlled combustion due to ignition by the spark plug.

6. The method as recited in claim 5, wherein the combustion position resulting from the combustion is determined with the aid of at least one characteristic map which includes at least one of the instantaneous manipulated variables and a physically based mathematical model which contains the instantaneous manipulated variables.

7. The method as recited in claim 1, wherein the alternating torques are corrected with regard to at least one of oscillating masses, variations in the alternating torques over time, and sensor wheel errors.

8. The method as recited in claim 7, wherein the variation in the alternating torques over time for each cylinder is added to one final integral value in each case, on the basis of which a cylinder-individual gas torque is deduced for each cylinder of the internal combustion engine.

9. The method as recited in claim 1, wherein the gas torques act on the crankshaft due to the pressure oscillations in the combustion chamber as a result of the combustion.

10. The method as recited in claim 1, wherein the comparison is of the final integral values to the reference final integral value.

11. The method as recited in claim 1, wherein the at least two ranges are a function of at least one of an ignition angle and an operating point of the internal combustion engine.

12. The method as recited in claim 1, wherein reference values ascertained based on values of prior combustion positions are used for the comparison.

13. The method as recited in claim 1, wherein the rotational speed is evaluated on the basis of tooth times of a sensor wheel which is mounted on the crankshaft.

14. The method as recited in claim 1, wherein the first range is sensitive to the controlled combustion which is triggered by the ignition of the spark plug and the second range characterizes an integral value which represents an abnormally early combustion position.

15. The method as recited in claim 1, wherein the first range is sensitive to the controlled combustion which is triggered by the ignition of the spark plug and the second range characterizes an integral value which represents an abnormally early combustion position.

16. A device for recognizing an uncontrolled combustion in an internal combustion engine which occurs independently of an ignition by a spark plug, the uncontrolled combustion occurring at least one of prior to ignition by the spark plug and prior to a normal combustion initiation for a given ignition point, the device comprising:
    a control unit configured to:
        determine a rotational speed of a crankshaft of the internal combustion engine, which is influenced by pressure oscillations in a combustion chamber triggered by the combustion;
        as a function of the determined rotational speed, ascertain a parameter which characterizes the combustion, wherein the parameter is of gas torques that are ascertained as alternating torques in which a variation over time is divided into at least two ranges;
    compute a final integral value for each range;
    compare at least one of:
        each of the final integral values to a reference final integral value, which has been determined during a controlled combustion due to the ignition of the spark plug;
        both of the final integral values to each other; and
        a difference between the final integral values to a reference comparative value, which has been determined during the controlled combustion; and
    deduce a presence of the uncontrolled combustion in response to a determination of a deviation in the comparison step.

* * * * *